(12) United States Patent  
Venkataraman et al.

(10) Patent No.: US 7,269,169 B1  
(45) Date of Patent: Sep. 11, 2007

(54) METHOD TO EXCHANGE RESOURCE CAPABILITY INFORMATION ACROSS NETWORK PEERS

(75) Inventors: Lakshminarayanan Venkataraman, Sunnyvale, CA (US); Chandrasekar Krishnamurthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 897 days.

(21) Appl. No.: 09/969,943

(22) Filed: Oct. 2, 2001

(51) Int. Cl.  
*H04L 12/28* (2006.01)

(52) U.S. Cl. .................................. 370/389; 370/395.1

(58) Field of Classification Search ............. 370/395.1, 370/397, 399, 395.3, 395.21, 395.54, 395.6, 370/395.61, 395.65, 395.64, 373, 377, 384, 370/386, 389, 392, 395.2, 395.5, 400, 409  
See application file for complete search history.

(56) References Cited

U.S. PATENT DOCUMENTS

| | | | | |
|---|---|---|---|---|
| 5,357,508 A | * | 10/1994 | Le Boudec et al. | 370/397 |
| 6,028,863 A | * | 2/2000 | Sasagawa et al. | 370/399 |
| 6,449,275 B1 | * | 9/2002 | Andersson et al. | 370/395.31 |
| 6,714,560 B1 | * | 3/2004 | Drover et al. | 370/467 |

OTHER PUBLICATIONS

"Configuring ATM Routing and PNNI," http://www.cisco.com/univercd/cc/td/doc/product/am/c8540/cnfg_gd/pnni_cnf.hrm, 61 pp. (May 9, 2001).

Butterfly-Glossary©: UVWXYZ Terms, "UNI" http://www.cnuce.pi.cnr.it/Butterfly/GlossarioUVWXYZ.html (Jul. 24, 2001).  
User Network Inteface from FOLDOC, "communications, networking," http://foldoc.doc.ic.ac.uk/foldoc/foldoc.cgi?User+Nettwork+Interface (Jul. 24, 2001).  
Network Node Interface from FOLDOC, "Network Node Interface," http://foldoc.doc.ic.ac.uk/foldoc/foldoc.cgi?NNI (Jul. 24, 2001).  
Backbone from FOLDOC, "Backbone," http://foldoc.doc.ic.ac.uk/foldoc/foldoc.cgi?backbone (Jul. 24, 2001).  
Internet backbone from FOLDOC, "Internet backbone," http://foldoc.doc.ic.ac.uk/foldoc/foldoc.cgi?Internet +backbone (Jul. 24, 2001).  
High-Tech Dictionary Definition, "Asynchronous Transfer Mode," http://www.computeruser.com/resources/dictionary/definition.html?lookup=737 (Jul. 24, 2001).

(Continued)

*Primary Examiner*—Brenda Pham  
(74) *Attorney, Agent, or Firm*—Blakely, Sokoloff, Taylor & Zafman LLP

(57) ABSTRACT

A method and apparatus to exchange resource capability information between two network peers. The signaling protocol is used to encapsulate resource capability information as a datagram within a user-definable data protocol data unit. In an ATM network using the SSCOP signaling protocol, the UD PDU may be used as a transport mechanism for resource capability information that cannot be exchanged via the ILMI protocol. VPI/VCI range information for a partitioned link may be encapsulated as a datagram within the UD PDU and exchange between nodes via the SSCOP. SSCOP UD PDU datagrams may be used in accordance with the present invention to exchange resource capability information between nodes. Alternatively, SSCOP UD PDU datagrams may be used to validate information exchanged via the ILMI protocol.

40 Claims, 3 Drawing Sheets

OTHER PUBLICATIONS

High-Tech Dictionary Definition, "UNI," http://www.computeruser.com/resources/dictionary/definition.html?lookup=5964 (Jul. 24, 2001).

MPLS—Webopedia Definition and Links, "MPLS," http://www.pcwebopaedia.com/TERM/M/MPLS.html (Jul. 25, 2001).

Node—a searchNetworking definition, http://searchnetworking.techtarget.com/sDefinition/o..sid7_gci212665,00.html (Sep. 5, 2001).

Learn the Net: Glossary: Node, "Node," http://www.learnthenet.com/english/glossary/node.htm (Sep. 5, 2001).

Glossary Search Results, "Node," http://www.ugeek.com/glossary/glossary_search.cgi?Node (Sep. 5, 2001).

Computer, Telephony and Electronics Glossary and Dictionary, http://www.csgnetwork.com/glossaryn.html (Sep. 5, 2001).

ATM Routing with IISP and PNNI, http://www.cisco.com/univercd/cc/td/doc/product/atm/c8540/wa5/12_0/3a_11/atm_tech/pnni.htm, 2 pp. (Aug. 3, 2001).

ATM Routing with IISP and PNNI, "Static Routing with IISP," http://www.cisco.com/univercd/cc/td/doc/product/atm/c8540/wa5/12_0/3a_11/atm_tech/pnni.htm, 3 pp. (Aug. 3, 2001).

\* cited by examiner

METHOD TO EXCHANGE RESOURCE CAPABILITY INFORMATION ACROSS NETWORK PEERS

FIELD OF THE INVENTION

This invention relates generally to the exchange of resource capability information between Asynchronous Transfer Mode (ATM) network nodes, and more specifically to the efficient exchange of such information using the Service Specific Connection Oriented Protocol (SSCOP).

BACKGROUND

A network consists of a group of switches (nodes) interconnected by a variety of interface types, for example optical interfaces. The SSCOP is a signaling protocol that guarantees reliable communication between nodes. The call control of a transmitting node sends packeted information to the SSCOP. The SSCOP encapsulates the packets and transmits the packets over a link to the SSCOP of another node where it is decoded and forwarded to the call control of the receiving node.

In some packet-based data transfer technologies, for example, ATM, the establishment of a connection between the call originator and call receiver requires the internodal exchange of resource capability information. However, ATM switches support several kinds of interface protocols, for example, user-network interfaces (UNIs) that connect end-systems, such as routers, to an ATM switch, private network—network interfaces (PNNIs) that are used for connections between networks, and ATM inter-network interfaces (AINIs). Each of these interfaces runs on its own protocol.

The resource capability information exchanged between nodes may include bandwidth allocation, virtual path identifier (VPI)/virtual channel identifier (VCI) ranges, type of interface and protocol that the node supports, and other information. Typically, this resource capability information is exchanged through a management plane protocol known as the interim local management interface (ILMI) protocol.

The ILMI protocol communicates between two nodes to determine the resource parameters of each and automatically configures the connection. For example, the VPIs and VCIs are of varying length and may have different lengths at different nodes. The number of bits allocated to represent the VPI and the VCI determine the range of possible VPIs and VCIs for that node. The ILMI protocol may determine that the VPI/VCI range of a given switch is 0–255/0–15 and the VPI/VCI range of another switch is 0–15/0–3. Restrictions within the common range are then made on the VPI/VCI to be used between the switches. Through ILMI polling of the switches, a common VPI/VCI range can be found and the internodal connection configured automatically.

ILMI falls short when the switches involved use partition-based resource allocation (i.e., link partitioning). Links may be logically partitioned allowing a single physical link to be viewed logically as two or more links. This logical partitioning allows different protocols (e.g., IP) to be transmitted over the same link. This is accomplished by dividing the resource range. For example, a switch that allocates 16 bits for its VPI may allocate 0 through 255 for PNNI data and 256–4095 for MPLS data and may allocate other ranges for other protocols. The ILMI protocol operates based on certain assumptions that are incompatible with a partitioned link scheme. One assumption that ILMI protocol operates on is that, on a link basis, the minimum VPI is one. This holds true for a non-partitioned link with only one protocol running, but not for partitioned links. Since a partitioned link may have, for example, PNNI protocol allocated from 0–255 and MPLS protocol allocated from 256–4095, the minimum VPI could be 256. If the resource configuration cannot be negotiated then the connections cannot be established and resources are wasted.

Further drawbacks of the ILMI protocol are that it is not applicable to all ATM protocols, for example, AINI. Therefore, such protocols may require manual resource configuration. ILMI is not designed to run on virtual trunks, i.e., ILMI is link-specific. And the full capabilities of ILMI are not required in all contexts and therefore running the ILMI protocol may unnecessarily tax system performance.

SUMMARY OF THE INVENTION

A method is described for the efficient exchange of network node resource capability information. Network node resource capability information is included in a user-extensible protocol data unit (PDU) of a signaling protocol. The information is then exchanged between network nodes. For one embodiment the resource capability information is included as a datagram in the user data (UD) PDU of the SSCOP and exchanged across peer ATM nodes.

Additional features and advantages of the present invention will be apparent from the accompanying drawings and from the detailed description that follows.

BRIEF DESCRIPTION OF THE DRAWINGS

The present invention is illustrated by way of example and not by way of limitation in the figures of the accompanying drawings in which like references indicate similar elements and in which.

DETAILED DESCRIPTION

The method herein described may be used for the efficient exchange of resource capability information across ATM peers using the SSCOP. Typically, nodes in an ATM network use SSCOP to provide mechanisms for the establishment, release, and monitoring of signaling information between peer signaling entities. The method of one embodiment of the present invention leverages an existing program data unit (PDU) within the SSCOP to exchange autoconfiguration information between network nodes. One embodiment uses the SSCOP user data (UD) PDU that was previously defined within the ATM standards. The use of the SSCOP helps to reduce the difficulties encountered in running a separate management layer protocol (e.g., ILMI protocol) to exchange the auto-configuration information. For one embodiment the UD PDU is used to exchange link-partitioning information. This allows the minimum VPI value to be assigned to any value within the partitioned range. The minimum VPI value is assigned to the minimum value within the range. For one embodiment the SSCOP UD PDU may exchange all of the auto-configuration information exchanged by the ILMI protocol and minimum VPI values for each link partition. This allows for auto-configuration of a partitioned link connection without the added overhead of the ILMI protocol.

An intended advantage of an embodiment of the present invention to provide reliable exchange of VPI/VCI ranges between nodes over a partitioned link. Another intended advantage of an embodiment is to provide efficient auto configuration of ATM nodes running ILMI-incompatible protocols. Another intended advantage of an embodiment is to provide validation of ILMI protocol internodal configuration. Another intended advantage of an embodiment is to provide resource capability information over a virtual trunk link. Another intended advantage of an embodiment is to avoid the unnecessary overhead of the ILMI protocol.

Figure 1:
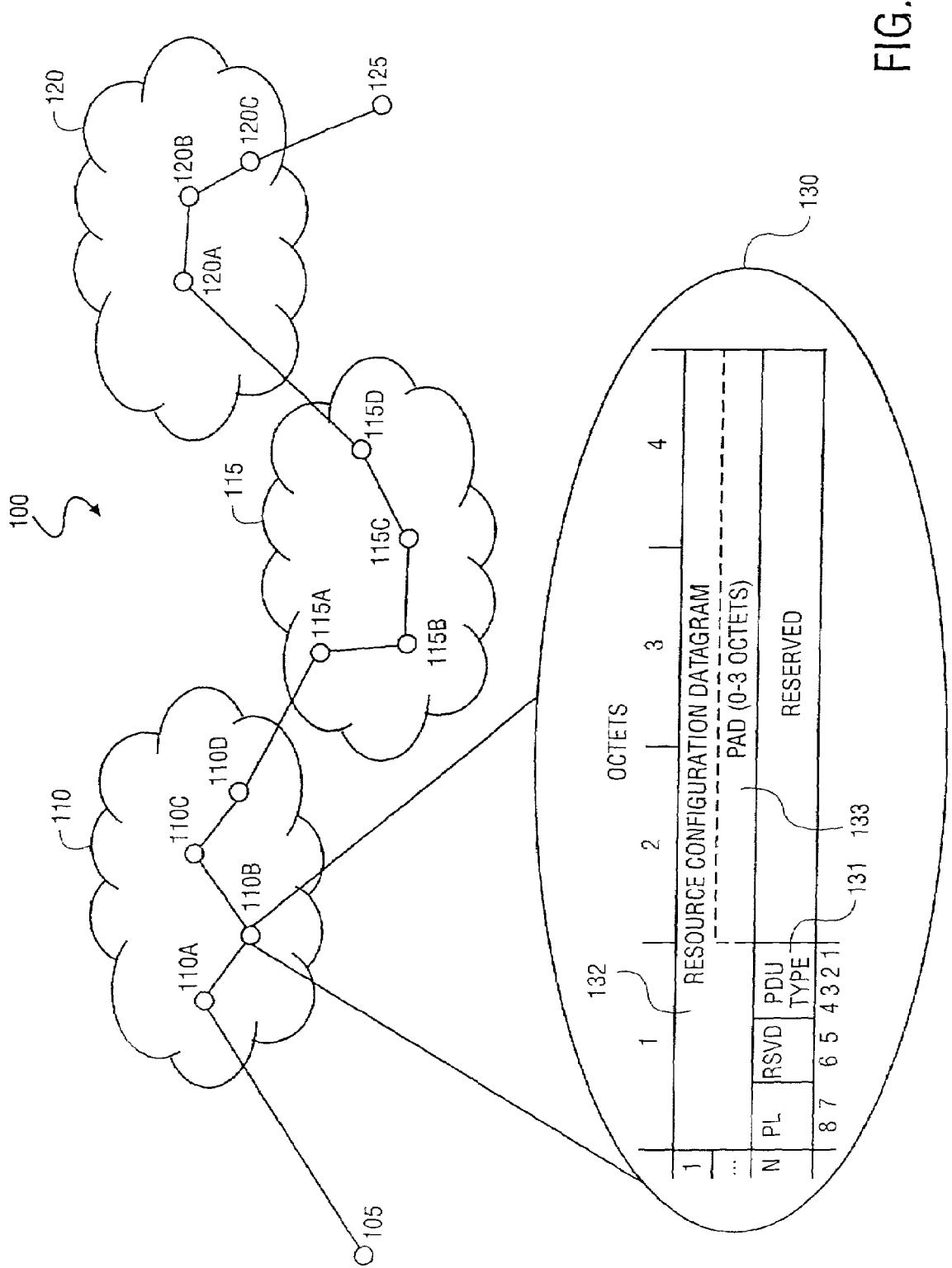
FIG. 1 illustrates the interconnection between end systems and ATM networks in accordance with one embodiment of the present invention.

FIG. 1 illustrates the interconnection between end systems and ATM networks in accordance with one embodiment of the present invention. The system 100, shown in FIG. 1, includes an end system 105 connected through networks 110, 115, and 120 to end system 125. Networks 110, 115, and 120 contain a plurality of nodes. Generally, a network node is an addressable point on a network that may connect a computer system, a terminal, or various peripheral devices to a network.

The connection between node 105 and node 110A of network 110 may use the UNI protocol while the connection between nodes 110D of network 110 and node 115A of network 115 may use the PNNI protocol. Connections between nodes within a network, e.g., nodes 110A–110D, may use the PNNI protocol or may use the interim Internet signaling protocol (IISP). IISP is an interim protocol designed to allow peer switches to interconnect using UNI-based signaling prior to PNNI. Although not as complex as PNNI, IISP is still in use for switches not yet implementing PNNI. IISP may be used to connect private networks running different proprietary implementations of PNNI. The connection between node 115D of network 115 and node 120A of network 120 may use the PNNI protocol or alternatively may use the IISP protocol or the AINI protocol if, for example, it is desirable that networks 115 and 120 do not exchange all of the network information that the PNNI protocol would exchange. The connection between node 120C of network 120 and end system 125 may use the UNI protocol.

Regardless of which protocol they are running, all of the ATM network nodes of system 100 use the SSCOP to exchange signaling information. The SSCOP is responsible for, among other things, the establishment of signaling information exchanged between peer signaling entities. The services provided by SSCOP include flow control to allow a switch to control the rate at which it receives signaling messages; error handling and sequencing to determine if any signaling information has been lost and request a retransmission; connection establishment and resynchronization; and status exchange to monitor the connection. The SSCOP provides this information in a series of defined PDUs. For example, a begin PDU (BGN) from one node initiates the information exchange with another node that sends an acknowledging PDU, BGNACK, via the SSCOP. However, the SSCOP includes PDUs that are user-definable and extensible. These PDUs may be used to exchange information between peer nodes. This information may be any information the user deems appropriate to exchange.

User-definable PDUs of the SSCOP may be used to exchange information. This may include information that the ILMI protocol is not designed to exchange. In system 100, the link connecting node 110B with node 110C may be a partitioned link. Some switches have the ability to partition a link (e.g., MGX switches available from Cisco Systems, Inc. of San Jose, Calif.). If the ILMI protocol is used to configure the VPI/VCI for a connection on such a partitioned link, a resource mismatch may occur because the ILMI protocol is not designed to autoconfigure partitioned links. The ILMI protocol operates based on the assumption that on a link basis, the minimum VPI is one. This assumption is with a partitioned link scheme. A partitioned link may have, for example, PNNI protocol allocated from 0–255 and MPLS protocol allocated from 256–4095. Therefore, the minimum VPI could be 256. For one embodiment, the VPI/VCI ranges for each partition of a partitioned link are exchanged between peer network nodes through the SSCOP. The VPI/VCI range information is included as a datagram in a user-definable PDU of the SSCOP. An example of such a datagram is included as Appendix A.

FIG. 1 includes an example of a SSCOP PDU 130 at node 110B. The SSCOP contains several PDUs that may be included with the connection setup information for various reasons. The particular PDU used is designated by a PDU type designator. The PDU type designator 131, shown in FIG. 1, identifies the PDU as a UD PDU (a user-definable and extensible PDU). The user-definable portion 132 of the PDU 130 may contain resource configuration information that may include VPI/VCI range information. The PDU 130 may contain padding 133, depending on the size of the user information, in order to fill a specified number of octets.

Figure 2:
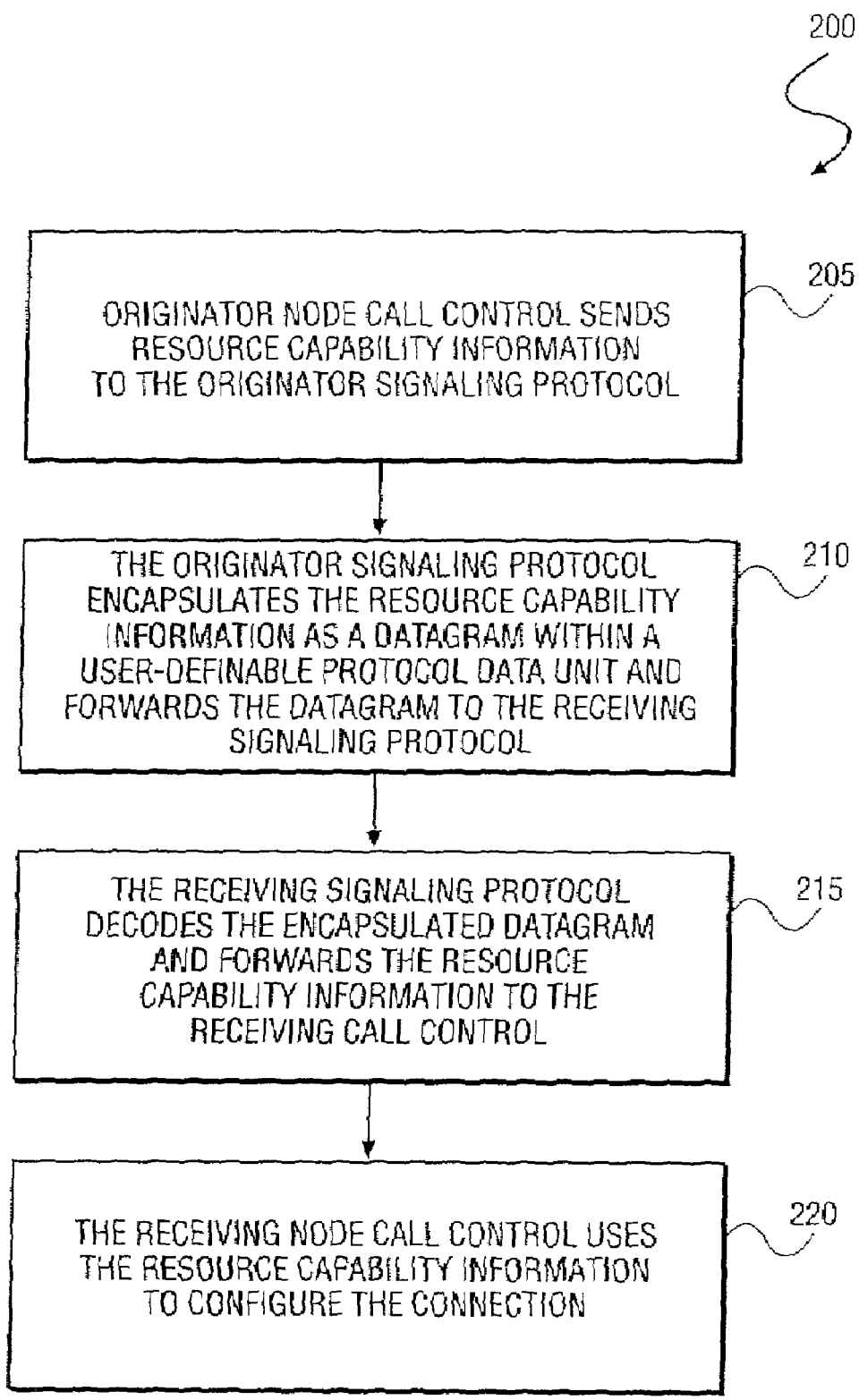
FIG. 2 is a process flow diagram in accordance with one embodiment of the present invention.

FIG. 2 is a process flow diagram in accordance with one embodiment of the present invention. The process 200, shown in FIG. 2, begins with operation 205 in which the call control of an originator node of a connection provides resource capability information to the SSCOP. The resource capability information may include VPI/VCI range information for a partitioned link connection. At operation 210, the SSCOP encapsulates the resource capability information as a datagram within a user-definable PDU (e.g., the UD PDU) and exchanges the datagram along with signaling information with another node to establish a connection. At operation 215 the SSCOP at the receiving node decodes the datagram and forwards the resource capability information to the call control of the receiving node. At operation 220 the call control of the receiving node uses the information to update its local link resource information. In this way the maximum and minimum VPI/VCI ranges for each node is communicated to the other node of the connection. This allows for proper VPI/VCI assignment.

The user-definable PDUs of the SSCOP may also be used to exchange information between peer nodes that are incompatible with the ILMI protocol and therefore cannot use the ILMI protocol for autoconfiguration. In system 100 the link connecting node 115D of network 115 and node 120A of network 120 may run the AIM protocol, for example. The AIM protocol may be employed to connect two autonomous networks without the exchange of all of the network information. For various reasons it may not be desirable for two networks to share all of the information that is exchanged using the PNNI protocol. In those cases the networks may use the AIM protocol. The AINI protocol is capable of encapsulating and decoding using the SSCOP. Therefore, an autoconfiguration information datagram may be included in a user-definable SSCOP PDU for an AINI protocol link to avoid the necessity of manual resource configuration. A similar datagram can be used to exchange configuration information between nodes using other protocols which are not ILMI compatible, but which use the SSCOP (e.g., IISP).

In general, a user-definable SSCOP PDU may be used to exchange any information that is exchanged through use of the ILMI protocol. For one embodiment, therefore, the ILMI protocol may be disabled and all information that would have been exchanged using the ILMI protocol may be exchanged through the SSCOP using datagrams inserted within user-definable PDUs. This may reduce system overhead and improve system performance. For an alternative embodiment, the ILMI protocol may be enabled and the present invention may be used to validate the information exchanged through the ILMI protocol. For example, in system 100, node 110B may be connected to node 110C using a PNNI protocol. This connection may be a single link connection (i.e., not a partitioned link) and may be capable of running the ILMI protocol. Nevertheless, it may be desirable to forego use of the ILMI protocol and instead exchange resource configuration information via a user-definable PDU of the SSCOP. This reduces system overhead associated with running the ILMI protocol and may, therefore, increase system performance. Alternatively, a datagram inserted into a user-definable PDU of the SSCOP may be used in conjunction with the ILMI protocol as independent validation of the resource configuration information exchanged by the ILMI protocol.

Figure 3:
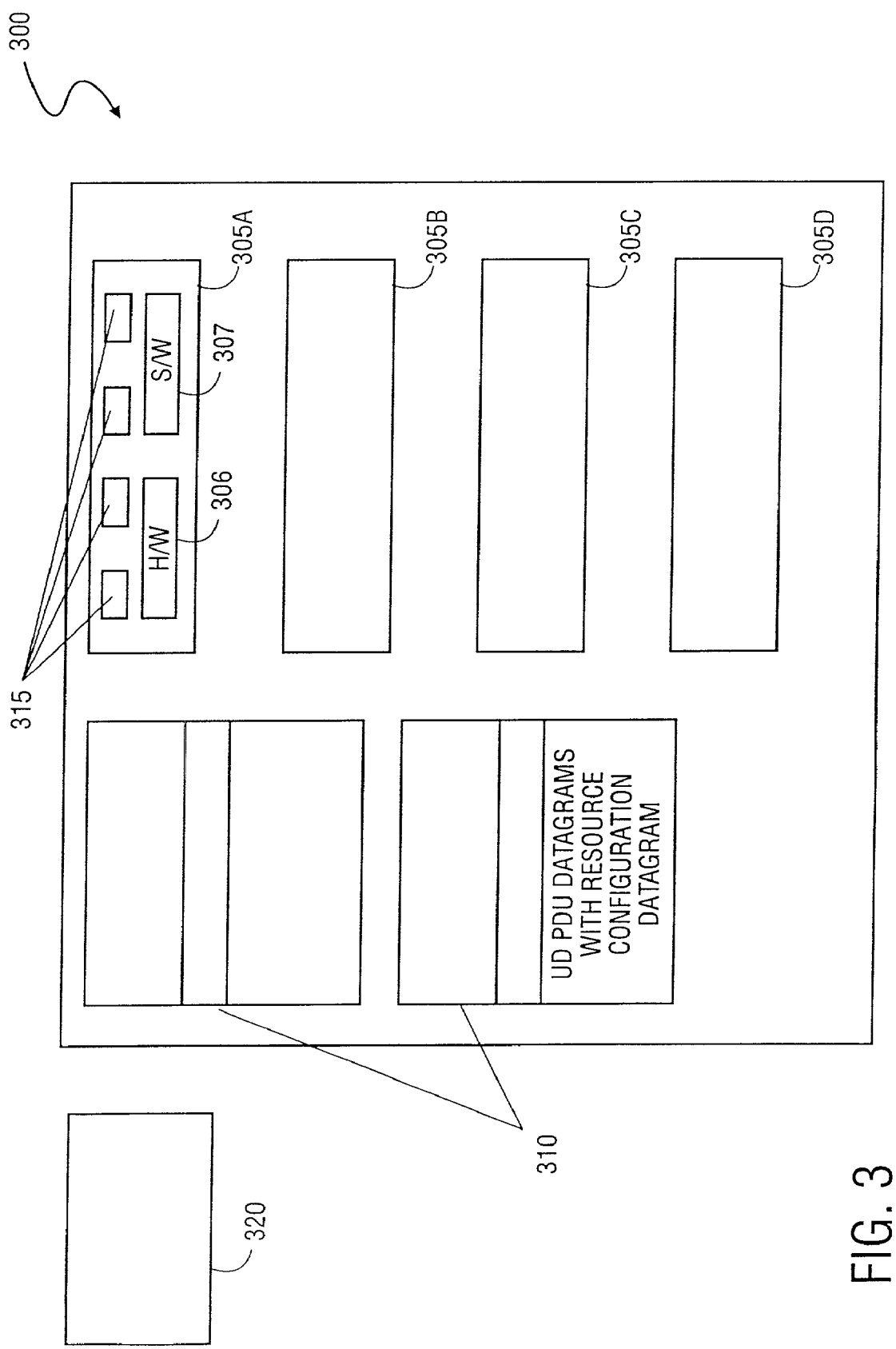
FIG. 3 illustrates a network node in which resource configuration information is encapsulated as a datagram within the signaling protocol in accordance with one embodiment of the present invention.

FIG. 3 illustrates a network node in which resource configuration information is encapsulated as a datagram within the signaling protocol in accordance with one embodiment of the present invention. The network node 300, shown in FIG. 3, contains line cards 305a through 305d. A typical node may contain four or more line cards and several control cards 310 that control the line cards. Each line card may contain four, eight, sixteen, or more ports. Line card 305a has a set of ports 315. Each port may support a specific data bit rate. User traffic may be received through one line card and transmitted through another. This cross-connection is determined by the control card 310 upon the establishment of a connection. Typically, each line card also contains a hardware module 306 to accomplish bit-level and cell-level functions (recombining, quality of service, etc.) and a software module 307 for reprogramming hardware upon changing connections. The control cards may typically run the various protocols and may contain datagrams for encapsulating resource configuration information within a user definable PDU (e.g., UD PDU) of a signaling protocol (e.g., SSCOP). Alternatively, such software may be implemented elsewhere within the node or external to the node.

A network management station (NMS) 320 communicates with control cards 310 to provision the node. The NMS 320 may also be implemented as part of the node and may communicate directly with the line cards (305a–305d).

The process of one embodiment of the present invention may be implemented through use of a machine-readable medium that includes any mechanism that provides or transmits information in a form readable by a machine (e.g., a computer)). For example, a machine-readable medium includes ROM, RAM, magnetic disc storage media, optical storage media, flash memory devices, electrical, optical, acoustical, or other form of propagated signals (e.g., carrier waves, infrared signals, digital signals, etc.); etc.

In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative rather a restrictive sense.

What is claimed is:

1. A method comprising:
   including a network node resource capability information within a user-definable protocol data unit of a signaling protocol;
   wherein the signaling protocol is the service specific connection oriented protocol, and
   exchanging the network node resource capability information between peer nodes of a network;
   wherein the resource capability information is used to verify a management plane protocol autoconfiguration; and
   wherein the management plane protocol comprises an interim local management interface (ILMI) protocol.

2. The method of claim 1 wherein the network is an asynchronous transfer mode network.

3. The method of claim 1 wherein the user-definable protocol data unit is a user data protocol data unit.

4. The method of claim 1, wherein the network nodes are connected via a partitioned link.

5. The method of claim 1 wherein the resource capability information comprises virtual path identifier/virtual circuit identifier range information.

6. The method of claim 2 wherein the network is running a data plane protocol selected from the list consisting of user-network interfaces (UNI), private network—network interfaces (PNNI), asynchronous transfer mode inter-network interfaces (AINI), interim Internet signaling protocol (IISP), and multilayer switching protocol (MLSP).

7. The method of claim 1 wherein the resource configuration information includes information selected from the list consisting of bandwidth, memory, and protocol information.

8. A method comprising:
   including within the user data protocol data unit of the service specific connection oriented protocol a network node resource capability information; and
   exchanging the resource capability information between two peer nodes of an asynchronous transfer mode network when a service specific connection oriented protocol link between the two nodes becomes operational;
   wherein the resource capability information is used to verify a management plane protocol autoconfiguration; and
   wherein the management plane protocol comprises an interim local management interface (ILMI) protocol.

9. The method of claim 8, wherein the resource capability information comprise virtual path identifier/virtual circuit identifier range information.

10. A method comprising the steps of:
   a) receiving a network node resource capability information from an originator node call control;
   b) encapsulating the resource capability information as a datagram within a user-definable protocol data unit;
   c) decoding the encapsulated datagram and forwarding the resource capability information to a receiving node call control such that the receiving node call control uses the resource capability information to configure a connection;
   d) wherein the resource capability information is used to verify a management plane protocol autoconfiguration; and
   wherein the management plane protocol comprises an interim local management interface (ILMI) protocol.

11. The method of claim 10 wherein the resource capability information is comprises virtual path identifier/virtual circuit identifier range information.

12. A computer-readable medium that provides computer executable instructions stores therein, which when executed by a computer processing system, cause the computer processing system to perform a method, the method comprising:
   including a network node resource capability information within a user-definable protocol data unit of a signaling protocol;
   wherein the signaling protocol comprises a service specific connection oriented protocol, and
   exchanging the network node resource capability information between peer nodes of a network;
   wherein the resource capability information is used to verify a management plane protocol autoconfiguration; and
   wherein the management plane protocol comprises an interim local management interface (ILMI) protocol.

13. The computer-readable medium of claim 12 wherein the network is an asynchronous transfer mode network.

14. The computer-readable medium of claim 12 wherein the user-definable protocol data unit comprises a user data protocol data unit.

15. The computer-readable medium of claim 12, wherein the network nodes are connected via a partitioned link.

16. The computer-readable medium of claim 12 wherein the resource capability information comprises virtual path identifier/virtual circuit identifier range information.

17. The computer-readable medium of claim 13 wherein the network is running a data plane protocol selected from the list consisting of user-network interfaces (UNI), private network—network interfaces (PNNI), asynchronous transfer mode inter-network interfaces (AINI), interim Internet signaling protocol (IISP), and multilayer switching protocol (MLSP).

18. The computer-readable medium of claim 12 wherein the resource configuration information includes information selected from the list consisting of bandwidth, memory, and protocol information.

19. A method comprising:
   forwarding a resource capability information of a first network node from a call control of the first network node to a signaling protocol;
   encapsulating the resource capability information of the first network node as a first datagram within a user-definable protocol data unit of the signaling protocol;
   forwarding the first datagram to a second network node via the signaling protocol;
   forwarding a resource capability information of a second network node from a call control of the second network node to the signaling protocol;
   encapsulating the resource capability information of the second network node as a second datagram within a user-definable protocol data unit of the signaling protocol; and
   forwarding the second datagram to the first network node via the signaling protocol,
   wherein the user-definable protocol data unit is a user data protocol data unit,
   wherein the network is running a data plane protocol selected from the list consisting of user-network interface (UNI), private network—network interfaces (PNNI), asynchronous transfer mode inter-network interfaces (AINI), interim Internet signaling protocol (IISP), and multilayer switching protocol (MLSP).

20. The method of claim 19, wherein the signaling protocol is the service specific connection oriented protocol.

21. The method of claim 20 wherein the network nodes are part of an asynchronous transfer mode network.

22. The method of claim 21 wherein the network nodes are connected via a partitioned link.

23. The method of claim 20 wherein the resource capability information is comprises virtual path identifier/virtual circuit identifier range information.

24. The method of claim 20 wherein the resource capability information is used to verify a management plane protocol autoconfiguration.

25. The method of claim 24 wherein the management plane protocol is the interim local management interface (ILMI) protocol.

26. The method of claim 20 wherein the resource configuration information includes information selected from the list consisting of bandwidth, memory, and protocol information.

27. An apparatus comprising:
   a network node having a resource configuration information; and
   a processor configured to run a signaling protocol, the signaling protocol having a user-definable protocol data unit, such that the resource configuration information of each node is encapsulated as a datagram within the user definable protocol data unit and exchanged between the network nodes via the signaling protocol;
   wherein the signaling protocol is the service specific connection oriented protocol;
   wherein the resource capability information is used to verify a management plane protocol autoconfiguration; and
   wherein the management plane protocol comprises an interim local management interface (ILMI) protocol.

28. The apparatus of claim 27 wherein the network nodes are part of an asynchronous transfer mode network.

29. The apparatus of claim 27 wherein the user-definable protocol data unit is a user data protocol data unit.

30. The apparatus of claim 27, wherein the network nodes are connected via a partitioned link.

31. The apparatus of claim 27 wherein the resource capability information is comprises virtual path identifier/virtual circuit identifier range information.

32. The apparatus of claim 28 wherein the network is running a data plane protocol selected from the list consisting of user-network interfaces (UNI), private network—network interfaces (PNNI), asynchronous transfer mode inter-network interfaces (AINI), interim Internet signaling protocol (IISP), and multilayer switching protocol (MLSP).

33. The apparatus of claim 27 wherein the resource configuration information includes information selected from the list consisting of bandwidth, memory, and protocol information.

34. An apparatus comprising:
   means for including a network node resource capability information within a user-definable protocol data unit of a signaling protocol;
   wherein the signaling protocol is the service specific connection oriented protocol; and
   means for exchanging the network node resource capability information between peer nodes of a network;
   wherein the resource capability information is used to verify a management plane protocol autoconfiguration; and
   wherein the management plane protocol comprises an interim local management interface (ILMI) protocol.

35. The apparatus of claim 34 wherein the network nodes are part of an asynchronous transfer mode network.

36. The apparatus of claim 34 wherein the user-definable protocol data unit is a user data protocol data unit.

37. The apparatus of claim 34, wherein the network nodes are connected via a partitioned link.

38. The apparatus of claim 34 wherein the resource capability information comprises virtual path identifier/virtual circuit identifier range information.

39. The apparatus of claim 35 wherein the network is running a data plane protocol selected from the list consisting of user-network interfaces (UNI), private network—network interfaces (PNNI), asynchronous transfer mode inter-network interfaces (AIM), interim Internet signaling protocol (IISP), and multilayer switching protocol (MLSP).

40. The apparatus of claim 34 wherein the resource configuration information includes information selected from the list consisting of bandwidth, memory, and protocol information.

* * * * *